(12) United States Patent
Otsuki (10) Patent No.: US 8,301,637 B2
(45) Date of Patent: Oct. 30, 2012

(54) FILE SEARCH SYSTEM, FILE SEARCH DEVICE AND FILE SEARCH METHOD

(75) Inventor: Tetsuaki Otsuki, Matsumoto (JP)

(73) Assignee: Seiko Epson Corporation (JP)

( * ) Notice: Subject to any disclaimer, the term of this patent is extended or adjusted under 35 U.S.C. 154(b) by 601 days.

(21) Appl. No.: 12/179,696

(22) Filed: Jul. 25, 2008

(65) Prior Publication Data

US 2009/0030898 A1    Jan. 29, 2009

(30) Foreign Application Priority Data

Jul. 27, 2007 (JP) ................. 2007-195771
Jun. 12, 2008 (JP) ................. 2008-153985

(51) Int. Cl.
*G06F 7/00* (2006.01)
(52) U.S. Cl. ........................................ 707/748
(58) Field of Classification Search .......... 707/705, 707/706, 722, 736, 742, 741, 758, 748
See application file for complete search history.

(56) References Cited

U.S. PATENT DOCUMENTS

| | | | | |
|---|---|---|---|---|
| 7,809,695 B2* | 10/2010 | Conrad et al. | ............... | 707/692 |
| 7,814,107 B1* | 10/2010 | Thirumalai et al. | ........... | 707/749 |
| 2002/0143802 A1* | 10/2002 | Chi et al. | ..................... | 707/203 |
| 2005/0198070 A1* | 9/2005 | Lowry | ........................ | 707/104.1 |
| 2005/0210003 A1* | 9/2005 | Tsay et al. | ...................... | 707/3 |
| 2006/0041597 A1* | 2/2006 | Conrad et al. | ............... | 707/200 |
| 2007/0198459 A1* | 8/2007 | Boone et al. | .................... | 707/1 |
| 2008/0005158 A1* | 1/2008 | Zartler et al. | ................. | 707/102 |

FOREIGN PATENT DOCUMENTS

JP    2002-334107    11/2002

* cited by examiner

*Primary Examiner* — Hung T Vy
(74) *Attorney, Agent, or Firm* — Harness, Dickey & Pierce, P.L.C.

(57) ABSTRACT

A file search system includes : a file analyze device including: a character string identifying unit; a first calculating unit; a second calculating unit; an analyzing unit; an output unit; and a file search device including a first obtaining unit; a second obtaining unit; an index storage unit; a file identifying unit; a ranking unit; and a notifying unit.

10 Claims, 3 Drawing Sheets

FILE SEARCH SYSTEM, FILE SEARCH DEVICE AND FILE SEARCH METHOD

CROSS REFERENCE TO RELATED APPLICATIONS

The entire disclosures of Japanese Patent Applications No. 2007-195771 filed on Jul. 27, 2007 and No. 2008-153985 filed on Jun. 12, 2008 are expressly incorporated by reference herein.

BACKGROUND

1. Technical Field

The present invention relates to a technology for searching a local file stored in a computer device.

2. Related Art

Some technologies for searching a file such as document in a computer device, are known. If plural files includes a required keyword, it is important to rank the files. One major approach to rank files is ranking in accordance with an order of date or an alphabetical order. In some cases, a user cannot find a required file from a search result with such a ranking.

In so-called the Internet search, it is well-known that files are ranked on the basis of referring relationship by a hyperlink. On the contrary, in so-called desktop search, a search within a local computer device, ranking on the basis of the hyperlink is less effective because less files are referred to each other compared with the Internet files.

In addition, as disclosed in JP-A-2002-334107, a system that obtains a search result by using a database, is also known.

SUMMARY

Recently, in an small or portable electronic device such as an electronic paper or a mobile phone, demand for searching a file is increasing. In many cases, such an electronic device has less resources (for example, processing power and storage capacity) than a desktop personal computer. Therefore, a search for a local file needs to be performed with limited resources. It is not suitable for an electronic device having limited resources to perform a search using a large database. In addition, complicated operations are generally required for a search, for example, for selecting a file or switching display, it is required for a small or portable electronic device to provide a search with uncomplicated operation.

The invention provides a technology for searching a file (more specifically, a local file) with limited resources.

According to one aspect of the invention, there is provided a file search system, including: a file analyze device including: a character string identifying unit configured to identify a character string included in a file and mode of displaying the character string, the file being included in a file group, the file group including a plurality of files; each of the plurality of files including a plurality of characters; a first calculating unit configured to calculate, for each character string included in each of the plurality of files, a first weight information, the first weight information showing peculiarity of the mode of displaying the character string compared with other character strings included in the file and being calculated on the basis of the character string and the mode identified by the character string identifying unit; a second calculating unit configured to calculate, for each character string included in each of the plurality of files, a second weight information, the second weight information showing peculiarity of the mode of displaying the character string compared with the character strings included in other files of the file group and being calculated on the basis of the character string and the mode identified by the character string identifying unit; an analyzing unit configured to calculate a parameter using the first weight information and the second weight information, for each character string included in the plurality of the files; and an output unit configured to output a matrix that enables to refer a parameter for a file or for a character string, the matrix including a plurality of elements, each of the elements being a parameter calculated by the analyzing unit; and a file search device including a first obtaining unit configured to obtain the matrix output by the output unit; a second obtaining unit configured to obtain a target character string, the target character string being a character string to be searched; an index storage unit configured to store an index describing character strings included in the plurality of files; a file identifying unit configured to identify a file including a character string corresponding to the target character string obtained by the second obtaining unit, by using the index stored in the index storage unit; a ranking unit configured to rank the plurality of files on the basis of the parameters of the character string corresponding to the target character string if the file identifying unit identifies a plurality of files includes the character string corresponding to the target character string, with reference to the matrix obtained by the obtaining unit; and a notifying unit configured to notify a search result including at least a part of the plurality of files identified by the file identifying unit, the search result being ranked by the ranking unit.

It is preferred that each of the plurality of files includes meta information. The file analyze device may further include: a meta information identifying unit configured to identify meta information included in each of the plurality of files; and a third calculating unit configured to calculate, for each of the plurality of files, a third weight information, the third weight information showing number of times or date of a predetermined process applied to the file, wherein the analyzing unit is configured to calculate the parameter by using the first weight information, the second information and the third information.

It is preferred that the mode of displaying the character string includes at least one of a plurality of elements, the plurality of elements including size, color, font and ornament of a character; if the mode includes a plurality of elements, the first calculating unit is configured to calculate the first weight information for each element.

It is preferred that the mode of displaying the character string includes at least one of a plurality of elements, the plurality of elements including size, color, font and ornament of a character; if the mode includes a plurality of elements, the second calculating unit is configured to calculate the second weight information for each element.

It is preferred that if the file included in the file group is changed, the analyzing unit is configured to calculate the parameter using a predetermined value as the second weight information.

According to another aspect of the invention, there is provided a file search device, comprising: a matrix storage unit configured to store a matrix that enables to refer a parameter for a file or for a character string, the matrix including a plurality of elements, each of the elements being a parameter showing a ranking of a character string included in the file; an index storage unit configured to store an index describing character strings included in the plurality of files; an obtaining unit configured to obtain a target character string, the target character string being a character string to be searched; a file identifying unit configured to identify a file including a character string corresponding to the target character string obtained by the second obtaining unit, by using the index stored in the index storage unit; a ranking unit configured to rank the plurality of files on the basis of the parameters of the character string corresponding to the target character string if the file identifying unit identifies a plurality of files includes the character string corresponding to the target character string, with reference to the matrix obtained by the obtaining unit; and a notifying unit configured to notify a search result including at least a part of the plurality of files identified by the identifying unit, the search result being ranked by the ranking unit.

According to yet another aspect of the invention, there is provided a file search method in a file search system including a file analyze device and a file search device, the file analyze device including a control unit, the file search device including a control unit and a storage unit, the method comprising: identifying, by the control unit of the file analyze device, a character string included in a file and mode of displaying the character string, the file being included in a file group, the file group including a plurality of files; each of the plurality of files including a plurality of characters; calculating, by the control unit of the file analyze device, for each character string included in each of the plurality of files, a first weight information, the first weight information showing peculiarity of the mode of displaying the character string compared with other character strings included in the file and being calculated on the basis of the character string and the identified mode; calculating, by the control unit of the file analyze device, for each character string included in each of the plurality of files, a second weight information, the second weight information showing peculiarity of the mode of displaying the character string compared with the character strings included in other files of the file group and being calculated on the basis of the character string and the identified mode; calculating, by the control unit of the file analyze device, a parameter using the first weight information and the second weight information, for each character string included in the plurality of the files; outputting, by the control unit of the file analyze device, a matrix that enables to refer a parameter for a file or for a character string, the matrix including a plurality of elements, each of the elements being the calculated parameter; obtaining, by the control unit of the file search device, the matrix output by the output unit; obtaining, by the control unit of the file search device, a target character string, the target character string being a character string to be searched; storing, by the control unit of the file search device in the storage unit, an index describing character strings included in the plurality of files; identifying, by the control unit of the file search device, a file including a character string corresponding to the target character string obtained by the second obtaining unit, by using the index stored in the index storage unit; ranking, by the control unit of the file search device, the plurality of files on the basis of the parameters of the character string corresponding to the target character string if a plurality of files are identified to include the character string corresponding to the target character string, with reference to the obtained matrix; and notifying a search result including at least a part of the identified plurality of files, the search result being ranked.

It is preferred that the file search method according to claim 7, wherein each of the plurality of files includes meta information, the file search method further includes: identifying, by the control unit of the file analyze device, meta information included in each of the plurality of files; and calculating, by the control unit of the file analyze device, for each of the plurality of files, a third weight information, the third weight information showing number of times or date of a predetermined process applied to the file, wherein the parameter is calculated by using the first weight information, the second information and the third information.

It is preferred that the mode of displaying the character string includes at least one of a plurality of elements, the plurality of elements including size, color, font and ornament of a character; if the mode includes a plurality of elements, the control unit of the file analyze device calculates the first weight information for each element.

It is preferred that the mode of displaying the character string includes at least one of a plurality of elements, the plurality of elements including size, color, font and ornament of a character; if the mode includes a plurality of elements, the control unit of the file analyze device calculates the second weight information for each element.

It is preferred that if the file included in the file group is changed, the control unit of the file analyze device calculates the parameter using a predetermined value as the second weight information.

BRIEF DESCRIPTION OF THE DRAWINGS

An embodiment of the present invention will be described in detail based on the following figures, wherein:

FIG. 11C shows a block diagram illustrating a functional configuration of a control unit 21;

DETAILED DESCRIPTION

Figure 1A:
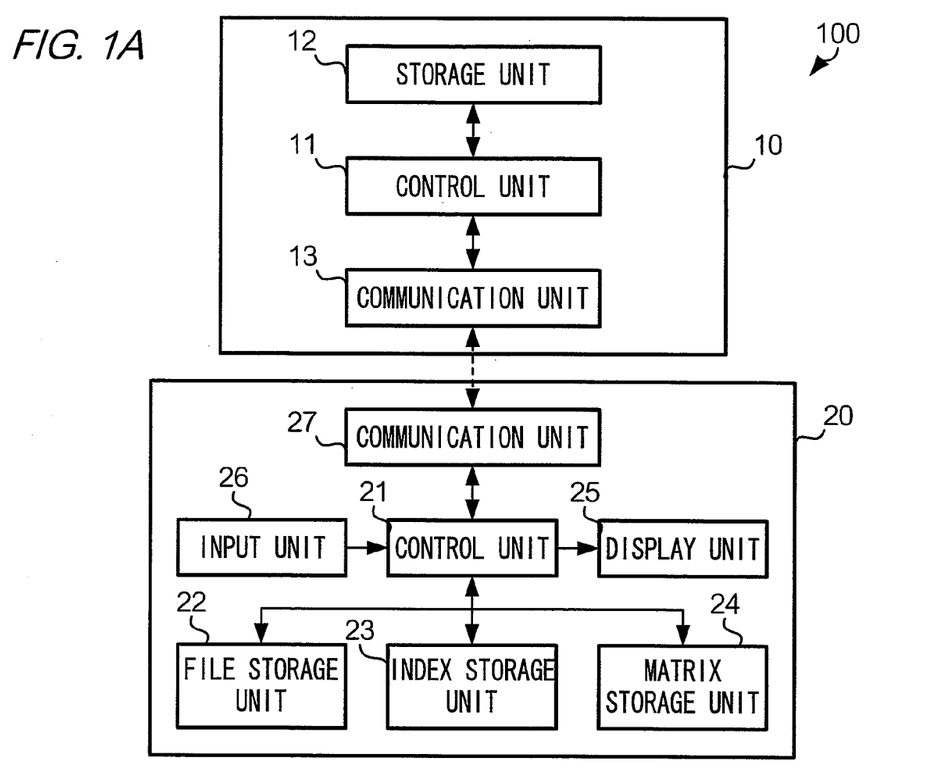
FIG. 1A shows a block diagram illustrating a configuration of a file search system in accordance with one embodiment of the invention.

One embodiment of the invention is described with reference to the drawings. For convenience of explanation, sentences and words are all written in the English language using Roman alphabet in the following description of the embodiment. However, the invention is applicable also to other languages, using characters other than Roman alphabet, such as the Japanese language. Numerals and symbols may be included in character strings 1. Configuration FIG. 1A is a block diagram illustrating a file search system 100 in accordance with one embodiment of the invention. As shown in FIG. 1A, the file search system 100 includes a file analyze device 10 and a file search device 20. The file search device 20 is a device for searching a file, and is a portable display device, more specifically, a so-called electronic paper. The file analyze device 10 is a device for generating data used in the file search device 10 and for providing the generated data with the file search device 20. In addition, the file analyze device 10 updates (or reconstructs) data in response to its necessity. In this example, the file analyze device 10 is an information processing device such as a personal computer.

The file analyze device 10 includes a control unit 11, a storage unit 12, and a communication unit 13. The control unit 11 includes a processor and a memory, and is an example of a control unit that controls an element of the file analyze device 10. In addition, the control unit 11 executes a process to generate or edit data (an index or a matrix) used for a search in the file search device 20. The storage unit 12 is an example of storage unit that stores data used for a search in the file analyze device 10. The communication unit 13 is an interface corresponding to a communication unit 27 in the file search device 20, and transmits/receives data to/from the file search device 20.

Figure 1B:
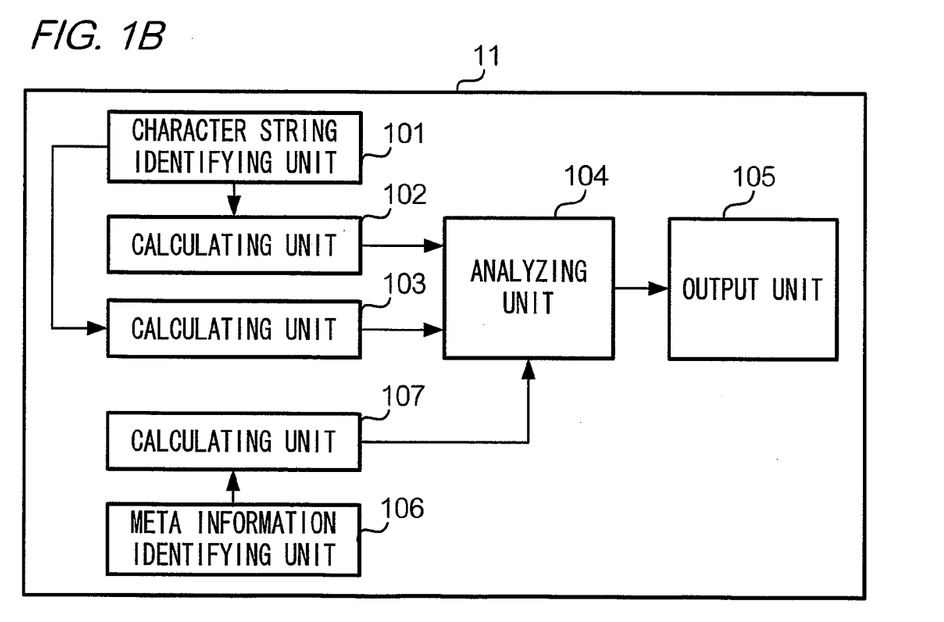
FIG. 1B shows a block diagram illustrating a functional configuration of a control unit 11.

FIG. 1B shows a functional configuration of the control unit 11. A character string identifying unit 101 identifies a character string included in a file and mode (state of way to display the character string) of displaying the character string. The file is included in a file group. The file group includes plural files; each of the plural files includes plural characters. A calculating unit 102 calculates a first weight information for each character string included in each of the plural files. The first weight information shows peculiarity of the mode of displaying the character string compared with other character strings included in the file. The first weight information is calculated on the basis of the character string and the mode identified by the character string identifying unit 101. A calculating unit 103 calculates a second weight information for each character string included in each of the plural files. The second weight information shows peculiarity of the mode of displaying the character string compared with the character strings included in other files of the file group. The second weight information is calculated on the basis of the character string and the mode identified by the character string identifying unit 101. An analyzing unit 104 calculates a parameter using the first weight information and the second weight information, for each character string included in the plurality of the files. An output unit 105 outputs a matrix that enables to refer a parameter for a file or for a character string. The matrix includes plural elements. Each of the elements is a parameter calculated by the analyzing unit 104. The functional elements shown in FIG. 1B are implemented by the control unit 11 executing a program stored in the storage unit 12.

In this example, each of the plural files includes meta information. A meta information identifying unit 106 identifies meta information included in each of the plural files. A calculating unit 107 calculates a third weight information for each of the plurality of files. The third weight information shows number of times or date of a predetermined process applied to the file. The analyzing unit 104 calculates the parameter by using the first weight information, the second information and the third information.

The file search device 20 includes a control unit 21, a file storage unit 22, an index storage unit 23 (an example of an index storage unit), a matrix storage unit 24 (an example of matrix storage unit), a display unit 25, an input unit 26, and a communication unit 27. The control unit 21 includes a processor such as a CPU (Central Processing Unit) and a memory, and is an example of a control unit that controls an element of the file search device 20. By the control unit 21 executing a program stored in the memory, a search function described later is implemented.

Each of the file storage unit 22, the index storage unit 23 and the matrix storage unit 24 is an example of a storage unit that stores data used in the file search device 20. Each of the index storage unit 23 and the matrix storage unit 24 includes a rewritable storage medium such as a flash memory. It is to be noted that the storage medium may have a detachable structure such as a memory card.

The file storage unit 22 stores a document file showing a document. The file storage unit has storage areas for storing plural document files. A document file includes plural characters which can be extracted. Furthermore, a document file includes meta information which describes an attribute of the document file or additional information.

In the present embodiment, the meta information includes at least one of character data or numeric data. Here, the "character data" refers to data showing character string, and the "numeric data" refers to data showing numeric such as date, time or number. For example, the character data includes filename, author name, title, category, or keyword. The numeric data includes, for example, generated date, last updated date, number of times to be referred, number of times to be updated, edited times, last output date. The term "output" includes to display at the file search device 20 and to print an image at a printer (not shown in the drawings).

The index storage unit 23 stores an index used for searching a document file. Here, the term "index" refers to data having a data structure to identify character string included in a document file stored in the storage unit 22 easily and quickly. The index provides a quicker search for a document file including a specific character string, compared with a direct search. The index may have any kind of known concrete structure.

The matrix storage unit 24 stores a matrix used for searching a document file. Here, the term "matrix" refers to data showing a group of parameters that provide ranking of the document files. It is preferred that the matrix has a data structure that enables to refer a parameter for a file and for a character string. The parameters are calculated by the file analyze device 10 and will be described in detail later.

Figure 1C:
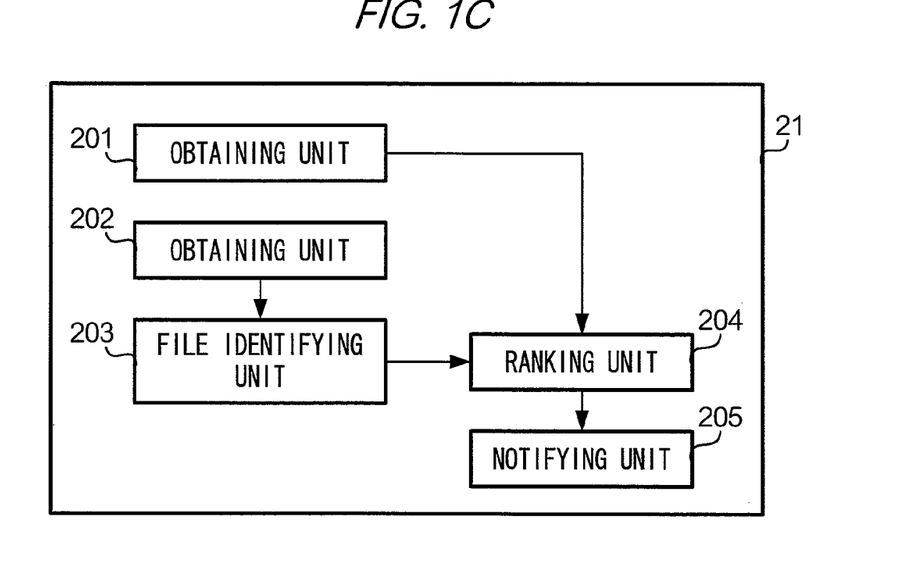

FIG. 1C shows a functional configuration of the control unit 21. An obtaining unit 201 obtains a matrix output from the file analyze device 10 (more specifically, the output unit 105). An obtaining unit 20 obtains a target character string, which is a character string to be searched. A file identifying unit 203 identifies a file including a character string corresponding to the target character string obtained by the obtaining unit 202, by using the index stored in the index storage unit 23. A ranking unit 204 ranks the plural files on the basis of the parameters of the character string corresponding to the target character string if the file identifying unit 203 identifies that plural files includes the character string corresponding to the target character string, with reference to the matrix obtained by the obtaining unit 201. A notifying unit 205 notifies a search result including at least a part of the plural files identified by the file identifying unit 203. The search result is ranked by the ranking unit 204. By the control unit 21 executing a program stored in the memory, functional elements shown in FIG. 1C are implemented.

The display unit 25 displays a screen showing a search request, a search result or a document shown by a document file. The display unit 25 includes, for example, a screen defined by plural pixels. The screen may include image-retaining display element such as cholesteric liquid crystal display. Here, the term "image-retaining display element" refers to a display device that can maintain a display state (in other words, a gradation) without supply of electric power. Such a display element provides lower power consumption because the display element does not need electric power other than rewriting a displayed image.

The input unit includes an interface via which a user inputs an instruction. In this example, an "instruction" includes an instruction to identify a character string to be searched (hereinafter, referred to as "target character string") and an instruction to control the display unit 25 (for example, identification of a document, identification of a page, or scroll). The input unit 26 includes a input device having keys such as a keyboard. Alternatively, the input unit 26 may be a touch panel mounted on the screen of the display unit 25. If the input unit 26 includes a touch panel, the control unit 21 may control the display unit 25 to display a specific image on the screen, or the control unit 21 may recognize the locus input by a user. A user may input the locus by a pen-type device such as a stylus or a touch pen.

The communication unit 27 includes an interface for transmitting/receiving data to/from the file analyze device 10. The interface may be a wired interface such as a USB (Universal Serial Bus) interface or a wireless interface such as an infrared communication interface.

The file analyze device 10 can refer a document file on the file storage unit 22, delete a document file from the file storage unit 22, or add a new document file to the file storage unit 22.

2. Operation

The file analyze device 10 generates an index and a matrix with configuration described above. The file analyze device obtains an index and a matrix, and searches a file in response to a user's request. In addition, the file analyze device 10 reconstructs (or updates) the matrix.

In the description below, operations for generating an index and a matrix in the file analyze device 10, searching a file in the file search device 20, and reconstructing a matrix in the file analyze device will be described.

2-1. Generating an Index and a Matrix

Figure 2:
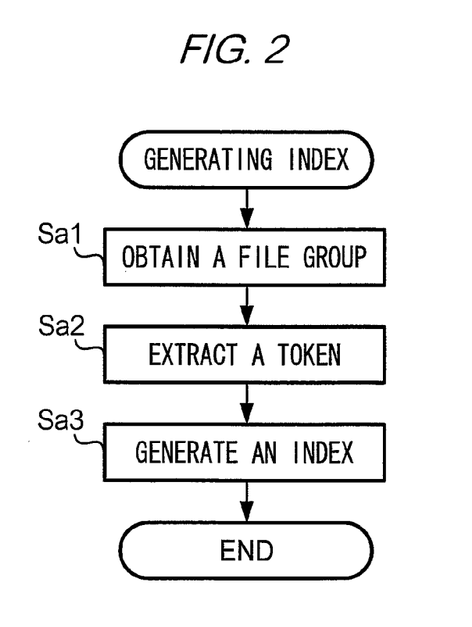
FIG. 2 shows a flowchart illustrating a process for generating an index.

The control unit 11 in the file analyze device 10 generates an index. FIG. 2 shows a flowchart illustrating a process for generating an index After obtaining the file group, the control unit 11 extracts a token (or a word) from the file group. In other words, the control unit 11 divides (in step Sa2) character strings included in the file group into plural tokens. Here, the term "token" refers to a character string including at least one character which is identified by predetermined algorithm. More specifically, the control unit 11 extracts character strings from each document file, divides the character strings in accordance with predetermined algorism, and extracts the divided character string as a token. In other words, the control unit 11 performs so-called "tokenize".

In a case that the meta information includes character data, the control unit 11 may extract a token from the meta information.

After extracting a token from the plural document files in the file group, the control unit 11 generates (in step Sa3) an index. More specifically, the control unit 11 identifies each token extracted from the file group, and gives a unique identifier (hereinafter, referred to as a "token ID") to each token. In addition, the control unit 11 identifies each document file, and gives a unique identifier (hereinafter, referred to as a "file ID") to each document file. The control unit 11 generates an index describing presence or absence of a token identified by a token ID for each document file in the file group. The presence or absence is denoted by a flag that has a value of "1" or "0".

Then, the control unit 11 generates a matrix. When generating a matrix, the token ID and the file ID given in generating an index, are used.

Figure 3:
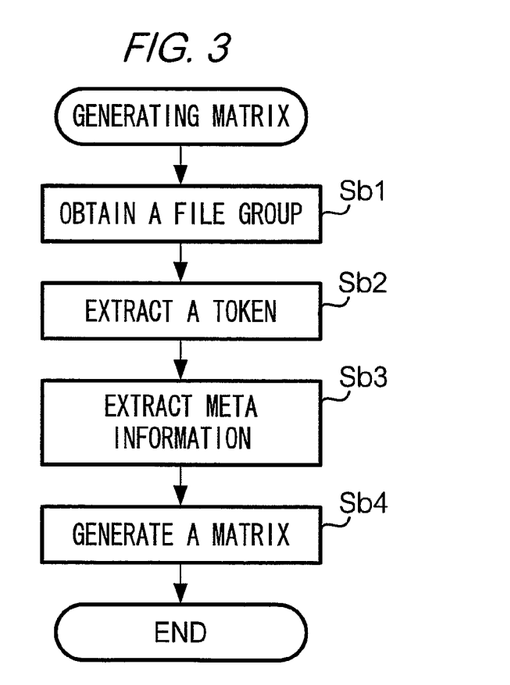
FIG. 3 shows a flowchart illustrating a process for generating a matrix.

FIG. 3 shows a flowchart illustrating an operation for generating a matrix, executed by the control unit 11. The control unit 11 obtains (in step Sb1) a file group, and extracts (in step Sb2) a token. If the generation of a matrix follows the generation of an index, the results in the steps Sa1 and Sa2 may be used and the steps Sb1 and Sb2 may be omitted.

Then, the control unit 11 extracts (in step Sb3) meta information from each file in the file group. Here, the control unit 11 extracts both the character data and the numeric data. The control unit 11 temporally stores the extracted meta information for each document file.

The control unit 11 calculates a parameter (or an analyzed value) for each token in each document file, and generates (in step Sb4) a matrix. The detail of a method for calculating the parameter is as follows.

First, the control unit 11 calculates a vector $F_{ij}$ as shown in an equation (1), and stores the vector $F_{ij}$. Here, a parameter i denotes the file ID, and a parameter j denotes the token ID. The "token j" refers to a token whose token ID is j. The "file i" refers to a file whose file ID is i. Here, the total number of the document files is m and the total number of the extracted tokens is n. In other words, the parameter i satisfies $1 \leq i \leq m$ and the parameter j satisfies $1 \leq j \leq n$. The total number of the elements of the vector $F_{ij}$ is m×n.

$$F_{ij} = (TknStr_{ij}\ TknFreq_{ij}\ FntSize_{ij}\ FntClr_{ij}\ FntType_{ij}\ StpWrdBool_{ij}) \quad (1)$$

Here, details of the elements of the vector $F_{ij}$ are described.

An element $TknStr_{ij}$ denotes a token. In other words, the element $TknStr_{ij}$ denotes that the token j is what kind of character string. In other words, the element $TknStr_{ij}$ denotes characters and the order of the characters includes in the token j. The element $TknStr_{ij}$ denotes the same tokens as long as the parameter j is the same, regardless of the parameter i.

An element $TknFreq_{ij}$ denotes a frequency of a token denoted by the element $TknStr_{ij}$ appears in the file i.

An element $FntSize_{ij}$ denotes a font size of a token denoted by the element $TknStr_{ij}$. If a document file includes the token j plural times (in other words, the token i appears in the document file plural times in different positions), the element $FntSize_{ij}$ has a data structure by which each font size can be referred for each position.

An element $FntClr_{ij}$ denotes a color of a token denoted by the element $TknStr_{ij}$. A color denoted by the element $FntClr_{ij}$ is represented in a predetermined color system (for example, an RGB color system) and a standard color (for example, black). The element $FntClr_{ij}$ may have a format similar to the HTML (HyperText Markup Language), by which black is represented by "000000" and white is represented by "111111", for example. If the document file i includes the token j plural times (in other words, the token j appears in the document file plural times in different positions), the element $FntClr_{ij}$ has a data structure by which a color can be referred for each position.

An element $FntType_{ij}$ denotes a font type of a token denoted by the element $TknStr_{ij}$. Here, the "font type" is, for example, "Arial", "Courier" and so on for English and "gothic", "Mincho" and so on for Japanese. If the document file i includes the token j plural times (in other words, the token j appears in the document file plural times in different positions), the element $FntType_{ij}$ has a data structure by which a font type can be referred for each position. For example, if a document file i includes the token j plural times and the token is represented by different font type in different position, the element $FntType_{ij}$ may include all the font type used for the token j.

An element $StpWrdBool_{ij}$ denotes whether a token denoted by the element $TknStr_{ij}$ is a stop word. Here, the term "stop word" refers to a character string having a lower priority for search than other tokens. In English, "the" and "of" are examples of the stop word. In Japanese, a particle is an example of the stop word. The stop word is predetermined. The stop word may be designed in any way. For example, the stop word may be determined in response to an algorism of the tokenize or the language of the document file.

The controller 11 calculates a weight matrix $W_{ij}$, which is defined by the vector $F_{ij}$ and plural weight information. The weight matrix $W_{ij}$ is defined by an equation (2) in detail.

$$W_{ij} = (\text{TknFntSizeRare}_{ij}, \text{TknFntClrRare}_{ij}, \text{TknFntTypeRare}_{ij}, \text{TknFntStylRare}_{ij}, \text{TknStpWrd}_{ij}, \text{FilePopularity}_{ij}, \text{MetaIncludesTkn}_{ij}) \quad (2)$$

Here, details of elements of the weight matrix $W_{ij}$ are described.

An element $\text{TknFntSizeRare}_{ij}$ denotes peculiarity of a font size of a token denoted by the element $\text{TknStr}_{ij}$. The element $\text{TknFntSizeRare}_{ij}$ is determined on the basis of a first weight information and a second weight information. The first weight information shows peculiarity of the font size of the token j compared with other tokens included in a single document file i. The second weight information shows peculiarity of the font size of the token j compared with the token j included in other document files of the file group. The element $\text{TknFntSizeRare}_{ij}$ is defined by an equation (3) in detail.

$$\text{TknFntSizeRare}_{ij} = \frac{\rho \left|1 - \frac{\text{AvgFntSize}_{ij}}{\frac{1}{m}\sum_{i=1}^{i=m} \text{AvgFntSize}_{ij}}\right| + \mu\left(\frac{\text{AvgFntSize}_{ij}}{v} - 1\right)}{\rho + \mu} \quad (3)$$

In the equation (3), the element $\text{AvgFntSize}_{ij}$ denotes an average of font sizes of tokens j in the document file i. The element $\text{AvgFntSize}_{ij}$ is calculated by using the element $\text{FntSize}_{ij}$ in the vector $F_{ij}$. For example, if the document file i includes the token j in two different position and the font sizes are "8" and "10", respectively, the element $\text{AvgFntSize}_{ij}$ is "9".

In addition, coefficients $\rho$ and $\mu$ are certain constants. A coefficient $v$ is a certain constant denoting a standard font size. It is preferred that the coefficient $v$ is determined on the basis of an average or a mode of font sizes appears in a document file.

In the equation (3), a part (excluding the coefficient $\rho$) of the first term of a numerator in the right hand side (hereinafter simply referred to as "the first term in the right hand side") corresponds to the second weight information and a part (excluding the coefficient $\mu$) of the second term of a numerator in the right hand side (hereinafter simply referred to as "the second term in the right hand side") corresponds to the first weight information. The larger the difference between the average of a token j in a document file i and the average of the token j in other document files becomes, the larger the first term in the right hand side becomes. If the average of the token j in the document file i equals to the average of the token in other document files, the first term in the right hand side takes the minimum value (zero, for example). The larger the difference between the average of the token j in the document file i and the standard font size becomes, the larger the second term in the right hand side becomes. If the average of the token j in the document file i is less than the standard font size, the second term in the right hand side takes a negative value.

An element $\text{TknFntClrRare}_{ij}$ denotes peculiarity of a color of a token denoted by the element $\text{TknStr}_{ij}$. More specifically, the element $\text{TknFntClrRare}_{ij}$ denotes a rate of a number of tokens whose color is not the standard color to a number of tokens whose color is the standard color, for a token j in a target document. The element $\text{TknFntSizeRare}_{ij}$ is defined by an equation (4) in detail. In the equation (4), a parameter $\text{NormClrNum}_{ij}$ denotes a number of tokens whose color is the standard color. A parameter $\text{OtherClrNum}_{ij}$ denotes a number of tokens whose color is not the standard color. The element $\text{TknFntSizeRare}_{ij}$ is calculated by using the element $\text{FntClr}_{ij}$ in the vector $F_{ij}$. Coefficients $\epsilon_1$-$\epsilon_5$ are constants that satisfy $0 < \epsilon_1 < \epsilon_2 < \epsilon_3 < \epsilon_4 < \epsilon_5 < 1$.

$$\text{TknFntClrRare}_{ij} = \quad (4)$$

$$\begin{cases} 1 \leftarrow \epsilon_5 \leq \frac{\text{OtherClrNum}_{ij}}{\text{NormClrNum}_{ij} + \text{OtherClrNum}_{ij}} \leq 1 \\ 0.8 \leftarrow \epsilon_4 \leq \frac{\text{OtherClrNum}_{ij}}{\text{NormClrNum}_{ij} + \text{OtherClrNum}_{ij}} < \epsilon_5 \\ 0.6 \leftarrow \epsilon_3 \leq \frac{\text{OtherClrNum}_{ij}}{\text{NormClrNum}_{ij} + \text{OtherClrNum}_{ij}} < \epsilon_4 \\ 0.4 \leftarrow \epsilon_2 \leq \frac{\text{OtherClrNum}_{ij}}{\text{NormClrNum}_{ij} + \text{OtherClrNum}_{ij}} < \epsilon_3 \\ 0.2 \leftarrow \epsilon_1 \leq \frac{\text{OtherClrNum}_{ij}}{\text{NormClrNum}_{ij} + \text{OtherClrNum}_{ij}} < \epsilon_2 \\ 0 \leftarrow 0 \leq \frac{\text{OtherClrNum}_{ij}}{\text{NormClrNum}_{ij} + \text{OtherClrNum}_{ij}} < \epsilon_1 \end{cases}$$

As defined in the equation (4), the larger the number of tokens whose color is not the standard color becomes, the larger the element $\text{TknFntClrRare}_{ij}$ becomes. If all tokens are represented in the standard color, the element $\text{TknFntClrRare}_{ij}$ is zero (the minimum value). If no tokens is represented in the standard color, the element $\text{TknFntClrRare}_{ij}$ is 1 (the maximum value).

An element $\text{TknFntTypeRare}_{ij}$ denotes peculiarity of a font type of a token denoted by the element $\text{TknStr}_{ij}$. The element $\text{TknFntTypeRare}_{ij}$ is calculated by using the element $\text{FntType}_{ij}$ in the vector $F_{ij}$. If at least one font type other than a standard font type is used for the token j, the element $\text{TknFntTypeRare}_{ij}$ is 1 (the maximum value). If all the token j is represented in the standard font type, the element $\text{TknFntTypeRare}_{ij}$ is zero (the minimum value). Here, the term "standard font type" refers to a font type most frequently used in the document file i. Alternatively, the term "standard font type" may refer to a font type most frequently used in the file group. In the former case, the element $\text{TknFntTypeRare}_{ij}$ denotes peculiarity of a font type in a document file. In the latter case, the element $\text{TknFntTypeRare}_{ij}$ denotes peculiarity of a font type in a file group.

An element $\text{TknFntStylRare}_{ij}$ denotes a level of ornament of a token denoted by the element $\text{TknStr}_{ij}$. Here, the term "ornament" refers to a mode of a character string, for example, underline, bold face, and oblique face. The ornament may include a dot placed upside of a character or an open character. A token with the ornament is considered to have peculiar mode. The larger the level of ornament of the token j becomes, the larger the element $\text{TknFntStylRare}_{ij}$ becomes. A token without the ornament is considered as standard. For example, if the token j is ornamented by the underline, the bold face and the oblique face, the $\text{TknFntStylRare}_{ij}$ is 1 (the maximum value). If the token J is ornamented by two of the underline, the bold face and the oblique face, the $\text{TknFntStylRare}_{ij}$ is 0.6. If the token j is ornamented by one of the underline, the bold face and the oblique face, the $\text{TknFntStylRare}_{ij}$ is 0.3. If the token j is not ornamented, the $\text{TknFntStylRare}_{ij}$ is zero (the minimum value).

An element $\text{TknStpWrd}_{ij}$ denotes whether a token denoted by the element $\text{TknStr}_{ij}$ is a stop word. The element $\text{TknStpWrd}_{ij}$ is calculated by using the element $\text{StpWrdBool}_{ij}$ in the vector $F_{ij}$. If the token j is a stop word, the element TknStp- Wrd$_{ij}$ is zero (the minimum value). If the token j is not a stop word, the element TknStpWrd$_{ij}$ is 1 (the maximum value).

An element FilePopularity$_{ij}$ denotes a popularity of a document file. The element FilePopularity$_{ij}$ depends on the file ID but does not depend on the token ID. Here, the term "popularity" refers to a value defined by a number of times that the document file is referred to and the latest date that the document file is referred to. The element FilePopularity$_{ij}$ is defined by an equation (5) in detail. In the equation (5), a parameter FileAccessNum$_i$ denotes a number of times that the target document is referred to. A parameter Date denotes a date that this process is carried out (hereinafter, referred to as a "current date"). A parameter DateLastUpdated$_i$ denotes the last date when the document file i is updated. The parameters FileAccessNum$_i$ and DateLastUpdated$_i$ is calculated on the basis of the meta information of the document file i. Coefficients σ and ω are certain constants.

$$FilePopularity_{ij} = \sigma \times FileAccessNum_i + \frac{\omega}{(Date - DateLastUpdated_i + 1)} \quad (5)$$

As defined in the equation (5), the larger the number of times that the document file i is, the larger the element FilePopularity$_{ij}$ is. The closer the last date when the document file i is updated is to the current date, the larger the element FilePopularity$_{ij}$ is. This is because it is considered that a file referred many times or the latest updated file may be important for a user.

An element MetaIncludesTkn$_{ij}$ denotes whether a token denoted by the element TknStr$_{ij}$ is included in the meta information. The element MetaIncludesTkn$_{ij}$ is calculated by using the meta information of the document file i. For example, if the word j is included in the meta information, the element MetaIncludesTkn$_{ij}$ is 1 (the maximum value). If the word j is included in the meta information, the element MetaIncludesTkn$_{ij}$ is zero (the minimum value).

The control unit 11 calculates a matrix K$_{ij}$ on the basis of the calculated weight matrix W$_{ij}$. The matrix is calculated by multiplying a certain constants P1-P6 with the elements of the weight matrix W$_{ij}$, and by adding the elements for columns and rows. The matrix K$_{ij}$ is defined by an equation (6). The matrix K$_{ij}$ includes parameters.

$$K_{ij} = P_1 \times TknFntSizeRare_{ij} + P_2 \times TknFntClrRare_{ij} + P_3 \times TknFntTypeRare_{ij} + P_4 \times TknFntStylRare_{ij} + P_5 \times TknStpWrd_{ij} + P_6 \times FilePopularity_{ij} + P_7 \times MetaIncludesTkn_{ij} \quad (6)$$

Figure 4:
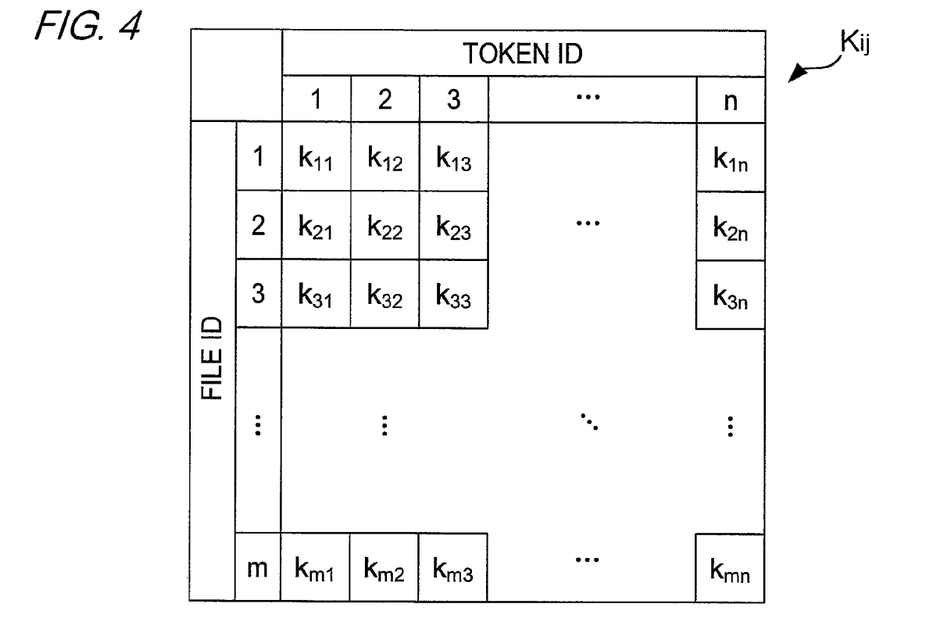
FIG. 4 shows an example of the matrix.

FIG. 4 shows an example of the matrix K$_{ij}$. As shown in FIG. 4, the matrix K$_{ij}$ has a data structure that enables to refer parameters k$_{11}$-k$_{mn}$ for a token ID and for a file ID. According to the matrix K$_{ij}$, if a token ID is identified, a computer device can refer a parameter for a document file, with regard to the token identified by the token ID.

It is preferred that the parameters k$_{11}$-k$_{mn}$ are integers. According to the configuration, the processing in the file search device 20 is simplified. To be the parameters k$_{11}$-k$_{mn}$ as integers, approximations on the basis of the equation (6) may be used.

As for a parameter for a token not included in a document file may be zero, null, or undefined.

The control unit 11 outputs the generated index and matrix, and provides the index and matrix to the search device 20 via the communication unit 13 and the communication unit 27.

The control unit 21 of the file search unit 20 stores the index in the index storage unit 23, and stores the matrix in the matrix storage unit 24.

2-2. Searching a Document File

The file search device 20 searches a document file by using an index and an matrix generated by the file analyze device 10. The search is triggered by an instruction by a user. The instruction is input with a search keyword at a search screen.

Figure 5:
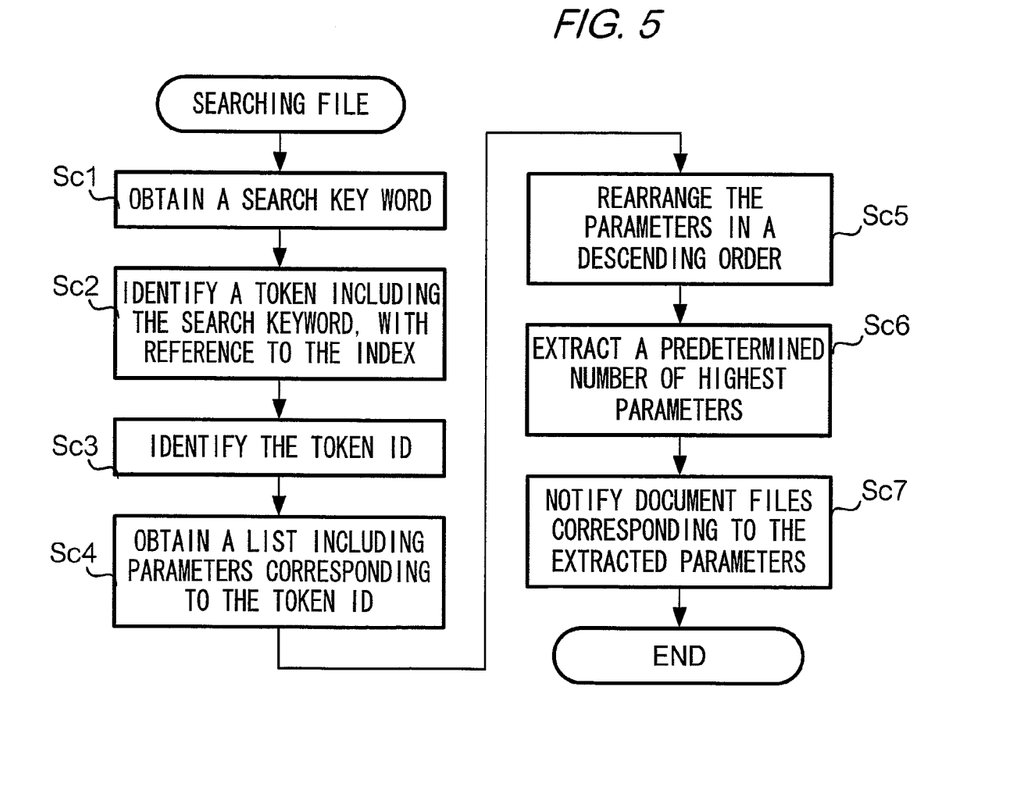
FIG. 5 shows a flowchart illustrating an operation for searching a document file.

FIG. 5 shows a flowchart illustrating an operation of the control unit 21 of the file search device 20. First, the control unit 21 obtains (in step Sc1) a search keyword via the input unit.

The control unit identifies (in step Sc2) a token including the search keyword, with reference to the index stored in the index storage unit 23. It is to be noted that the identified token need not be the same as the search keyword. Plural token may be identified. For example, if the search keyword is "do", the control unit 21 may identify tokens "do" and "dog". Then, the control unit 21 identifies (in step Sc3) the token ID of the identified token.

The control unit 21 obtains (in step Sc4) a list including parameters corresponding to the identified token ID, with reference to the matrix stored in the matrix storage unit 24. For example, if the token j is identified, the control unit 21 obtains a list including the parameters k$_{1j}$, k$_{2j}$, k$_{3j}$, ..., k$_{(m-1)j}$, and k$_{mj}$.

The control unit 21 compares the obtained parameters, and rearranges (in step Sc5) the parameters in a descending order (or ascending order). The control unit 21 extracts (in step Sc6) predetermined number (for example, ten) of parameters having the highest values. The control unit 21 notifies (in step Sc7) document files corresponding to the extracted parameters, as the search results. The search results may be notified, for example, by displaying at least a part of the document files. Alternatively, the search results may be notified by displaying at least a part of the meta information, for example, a filename and a author name.

If the search results include information relating plural document files, the control unit 21 may notify the search results in an descending order of the parameters. The control unit 21 notifies the search results so that a user can select a document file corresponding to the highest parameter with less operation, for example, less page update or less scroll. In one embodiment, the document file corresponding to the highest parameter is displayed at the top of the screen showing the search results.

2-3. Update of the Matrix

Once the index and the matrix are obtained from the file analyze device 10, the file search device may used the index and the matrix as long as the document files included in the file group is not changed. However, if a new document file is added to the file group, it is necessary to update the index and the matrix. Alternatively, if contents of a document file are updated, it is necessary to update the index and the matrix. Here, description is given for an example that the file analyze device 10 updates a matrix. It is noted that an index may be updated by a known technology.

It is preferred that the matrix is updated every time the contents of the file group are changed. However, since the matrix generation and the file search are performed in different devices, the file analyze device may not detect that the contents of the file group are changed. Therefore, in the present embodiment, the update of a matrix is performed at a predetermined timing in a condition that the file analyze device 10 and the file search device 20 are connected.

The update of a matrix may be performed by repeating the generation of a matrix described above. However, in some case, the generation of a matrix may need a certain time. If the system has a large number of document files, the generation of a matrix needs long time. In the present embodiment, a matrix is updated by a simpler way so as to reduce time to update the matrix.

In the update process of the present embodiment, a part of the elements of the weight matrix $W_{ij}$, which needs to refer other document files to be calculated, are substituted with a predetermined value. For example, to calculate the elements TknFntSizeRare$_{ij}$, an equation (7) is used instead of the equation (3).

$$TknFntSizeRare_{ij} = \frac{\rho \times Const + \mu\left(\frac{AvgFntSize_{ij}}{v} - 1\right)}{\rho + \mu} \quad (7)$$

The equation (7) differs from the equation (3) in a point of the first term of the right hand side. In the equation (3), the first term of the right side corresponds to the second weight information. To calculate the second weight information, it is necessary to calculate an average of the token j in other document files. However, in the equation (7), this part is substituted with a product of constants Const and $\bar{\rho}$. Therefore, there is no need to calculate an average of the token j in other document files. It is preferred that the control unit 11 calculates the constant Const prior to the update process, for example, by calculating averages of the first term of the element TknFntSizeRare$_{ij}$.

Other elements may be calculated by using a constant that substitutes a parameter calculated with reference to other document files.

3. Effect of the Embodiment

According to the file search system in the embodiment, the generation of an index or a matrix and the file search are performed in different devices, the file analyze device 10 and the file search device 20. Therefore, if the file search device 20 has limited resources, the file search is performed with less resources compared with a file system that does not have the configuration described above. Thus, a small or light device can provide useful search results.

The file analyze device 10 calculates parameters by using the first weight information and the second weight information. The first weight information depends on a peculiarity of a mode of displaying the target token compared with other character strings included in the document file i. The second weight information depends on a peculiarity of a mode of displaying the target token compared with the target token in other document files. Thus, the system can provide more useful search result compared with displaying alphabetical order or date order. In general, a character string having a peculiar mode to be displayed is more important than other character strings. According to the present embodiment, a document file including a search keyword in an important part tends to be ranked higher.

Since the file analyze system use the first weight information and the second weight information, the system can obtain search results reflecting relationship with other document files. If the parameter is calculated without using the second weight information, a document file including less tokens tends to be ranked higher than a document file including more tokens. Without the relationship with other document files, the search results may be different from a result that a user requires. The file analyze device 10 improve the difference between the search results and user's requirements.

The file search device 20 obtains from the file analyze device 10 a matrix shown in FIG. 4. By using the matrix, the file search device 20 can rank the search results with less resources compared with a system without the matrix.

According to the matrix, the file search system can obtain parameters corresponding to an identified token ID. The ranking can be performed by comparing the parameters. Therefore, the file search device 20 can perform ranking with less calculation load.

In addition, according to the embodiment, a matrix is updated as described above. The update is completed in a shorter time than the time required for the generation of a new matrix. Therefore, even if the matrix is calculated using a parameter that requires to refer other document files such as the second weight information, the update may be completed in shorter time.

4. Further Embodiment

The invention is not limited to the embodiment described above, and may be implemented as various embodiments. Some modifications are described here. At least two modifications may be combined.

The file analyze device 10 and the file search device may be a single device. To apply the invention to a personal computer, this configuration is preferred.

The file search device 20 may have multi cores or a multi task function, In this case, the access to the index storage unit 23 and the access to the matrix storage unit 24 are executed as separate processes. This configuration provides faster operation.

The invention may be applied to so-called and-search, or-search, or minus-search. In addition, the invention may be applied to so-called phrase search.

The document file may not include the meta information. If the document file does not include the meta information, elements relating to the meta information, such as the elements FilePopularity$_{ij}$ and MetaIncludesTkn$_{ij}$ may be omitted. The other elements in the vector $F_{ij}$ and the matrix $W_{ij}$ may be omitted.

The equation (5) uses a number of times of a process or recency of the process. In the embodiment, the process is "refer". The other process may be used as the "process" in the equation (5). For example, if the meta information includes the numeric data, the process in the equation (5) may be "output" or "edit".

The file analyze unit 10 may output the parameters in a format other than a matrix. The file analyze unit 10 may output the parameters in other data structure. In this case, the file search device 20 generate a matrix on the basis of the received parameters.

In the embodiment above, the file to be processed is a document file. However, the file to be processed is not limited to the document file. Any kind of file may be a file to be processed in the invention.

In the embodiment above, the functional elements shown in FIG. 1B are included in the control unit 11. However, the relationship between a functional element and a hardware element is not restricted to that of the embodiment. For example, the file analyze device 10 may include another processor. The processor may function as a part of the functional elements shown in FIG. 1B. A part of process executed by the control unit 11 in the embodiment may be executed the processor. This modification may also be applied to FIG. 1C and the control unit 21. A part of the functional elements shown in FIGS. 1B and 1C may be omitted.

The program executed by the control unit 11 and the control unit 21 may be provided as stored in a computer-readable storage medium, for example, a magnetic storage medium (a magnetic tape or a magnetic disk such as a HDD or a FD), an optical storage medium (an optical disk such as a CD or a DVD), an optical-magnetic storage medium, a semiconductor memory (a flash ROM). The program may be downloaded via a network such as the Internet.

What is claimed is:

1. A file search system, comprising:
a file analyze device, and
a file search device, wherein
the file analyze device includes:
   a first processor, and
   a first memory, wherein
   the first processor is configured to identify a character string included in a file and mode of displaying the character string, the file being included in a file group, the file group including a plurality of files; each of the plurality of files including a plurality of characters;
   the first processor is further configured to calculate, for each character string included in each of the plurality of files, a first weight information, the first weight information showing peculiarity of the mode of displaying the character string compared with other character strings included in the file and being calculated on the basis of the identified character string and the identified mode;
   the first processor is further configured to calculate, for each character string included in each of the plurality of files, a second weight information, the second weight information showing peculiarity of the mode of displaying the character string compared with the character strings included in other files of the file group and being calculated on the basis of the identified character string and the identified mode;
   the first processor is configured to calculate a parameter using the first weight information and the second weight information, for each character string included in the plurality of the files; and
   the first processor is configured to output a matrix that enables to refer a parameter for a file or for a character string, the matrix including a plurality of elements, each of the elements being the calculated parameter; and
the file search device includes:
   a second processor, and
   a second memory, wherein
   the second processor is configured to obtain the matrix output from the file analyze device;
   the second processor is further configured to obtain a target character string, the target character string being a character string to be searched;
   the second processor is further configured to store in the second memory an index describing character strings included in the plurality of files;
   the second processor is further configured to identify a file including a character string corresponding to the obtained target character string, by using the index stored in the second memory;
   the second processor is further configured to rank the plurality of files on the basis of the parameters of the character string corresponding to the target character string if the second processor identifies a plurality of files includes the character string corresponding to the target character string, with reference to the obtained matrix; and
   the second processor is further configured to notify a search result including at least a part of the identified file, the search result being ranked by the second processor.

2. The file search system according to claim 1, wherein
each of the plurality of files includes meta information,
the first processor is further configured to identify meta information included in each of the plurality of files,
the first processor is further configured to calculate, for each of the plurality of files, a third weight information, the third weight information showing number of times or date of a predetermined process applied to the file,
the first processor is configured to calculate the parameter by using the first weight information, the second information and the third information.

3. The file search system according to claim 1, wherein
the mode of displaying the character string includes at least one of a plurality of elements, the plurality of elements including size, color, font and ornament of a character;
if the mode includes a plurality of elements, the first processor is configured to calculate the first weight information for each element.

4. The file search system according to claim 1, wherein
the mode of displaying the character string includes at least one of a plurality of elements, the plurality of elements including size, color, font and ornament of a character;
if the mode includes a plurality of elements, the first processor is configured to calculate the second weight information for each element.

5. The file search system according to claim 1, wherein
if the file included in the file group is changed, the first processor is configured to calculate the parameter using a predetermined value as the second weight information.

6. A file search method in a file search system including a file analyze device and a file search device, the file analyze device including a control unit, the file search device including a control unit and a storage unit, the method comprising:
identifying, by the control unit of the file analyze device, a character string included in a file and mode of displaying the character string, the file being included in a file group, the file group including a plurality of files; each of the plurality of files including a plurality of characters;
calculating, by the control unit of the file analyze device, for each character string included in each of the plurality of files, a first weight information, the first weight information showing peculiarity of the mode of displaying the character string compared with other character strings included in the file and being calculated on the basis of the character string and the identified mode;
calculating, by the control unit of the file analyze device, for each character string included in each of the plurality of files, a second weight information, the second weight information showing peculiarity of the mode of displaying the character string compared with the character strings included in other files of the file group and being calculated on the basis of the character string and the identified mode;
calculating, by the control unit of the file analyze device, a parameter using the first weight information and the second weight information, for each character string included in the plurality of the files;
outputting, by the control unit of the file analyze device, a matrix that enables to refer a parameter for a file or for a character string, the matrix including a plurality of elements, each of the elements being the calculated parameter;

obtaining, by the control unit of the file search device, the matrix output by the output unit;

obtaining, by the control unit of the file search device, a target character string, the target character string being a character string to be searched;

storing, by the control unit of the file search device in the storage unit, an index describing character strings included in the plurality of files;

identifying, by the control unit of the file search device, a file including a character string corresponding to the target character string obtained by the second obtaining unit, by using the index stored in the index storage unit;

ranking, by the control unit of the file search device, the plurality of files on the basis of the parameters of the character string corresponding to the target character string if a plurality of files are identified to include the character string corresponding to the target character string, with reference to the obtained matrix; and notifying a search result including at least a part of the identified plurality of files, the search result being ranked.

7. The file search method according to claim 6, wherein each of the plurality of files includes meta information, the file search method further comprises:

identifying, by the control unit of the file analyze device, meta information included in each of the plurality of files; and calculating, by the control unit of the file analyze device, for each of the plurality of files, a third weight information, the third weight information showing number of times or date of a predetermined process applied to the file, wherein the parameter is calculated by using the first weight information, the second information and the third information.

8. The file search method according to claim 6, wherein the mode of displaying the character string includes at least one of a plurality of elements, the plurality of elements including size, color, font and ornament of a character;

if the mode includes a plurality of elements, the control unit of the file analyze device calculates the first weight information for each element.

9. The file search method according to claim 6, wherein the mode of displaying the character string includes at least one of a plurality of elements, the plurality of elements including size, color, font and ornament of a character;

if the mode includes a plurality of elements, the control unit of the file analyze device calculates the second weight information for each element.

10. The file search method according to claim 6, wherein if the file included in the file group is changed, the control unit of the file analyze device calculates the parameter using a predetermined value as the second weight information.

* * * * *